US012285387B2

(12) United States Patent
Linclau

(10) Patent No.: US 12,285,387 B2
(45) Date of Patent: Apr. 29, 2025

(54) FLEXOR PRESS

(71) Applicant: Courtney Linclau, Freeland, WA (US)

(72) Inventor: Courtney Linclau, Freeland, WA (US)

( * ) Notice: Subject to any disclaimer, the term of this patent is extended or adjusted under 35 U.S.C. 154(b) by 597 days.

(21) Appl. No.: 17/555,187

(22) Filed: Dec. 17, 2021

(65) Prior Publication Data

US 2022/0192921 A1 Jun. 23, 2022

Related U.S. Application Data

(60) Provisional application No. 63/128,646, filed on Dec. 21, 2020.

(51) Int. Cl.
*A61H 39/04* (2006.01)

(52) U.S. Cl.
CPC ..... *A61H 39/04* (2013.01); *A61H 2201/0107* (2013.01); *A61H 2201/0153* (2013.01)

(58) Field of Classification Search
CPC ........ A61H 39/04; A61H 7/001; A61H 7/003; A61H 7/007; A61H 23/06; A61H 2201/53; A61H 2201/1253
See application file for complete search history.

(56) References Cited

U.S. PATENT DOCUMENTS

| | | | | | |
|---|---|---|---|---|---|
| 2,127,674 | A * | 8/1938 | Clarke | A61H 7/003 15/210.1 |
| 5,817,037 | A | 10/1998 | Zurbay | |
| 2006/0155225 | A1 | 7/2006 | Murdock et al. | |
| 2013/0030332 | A1 * | 1/2013 | Ingrassia | A61H 7/002 601/19 |
| 2016/0324717 | A1 | 11/2016 | Burton | |
| 2022/0117832 | A1 | 4/2022 | Koth | |

FOREIGN PATENT DOCUMENTS

| | | | | |
|---|---|---|---|---|
| CN | 1984629 | B | 1/2013 | |
| JP | 5665917 | B2 | 2/2015 | |
| TW | M283540 | U | 12/2005 | |
| WO | WO-2007051233 | A1 * | 5/2007 | A61H 39/04 |

OTHER PUBLICATIONS

Tuscom, Deep Tissue Massage Saver Massager, Retrieved from Walmart, Retrieved on Oct. 16, 2020 <URL: walmart.com/ip/Tuscom-Manual-Deep-Tissue-Massage-Tool-Thumb-Saver-Massager-Physiotherapy-Trigger-Point-Massage-Tool/434653362?wmlspartner=imp_27795&selectedSellerId=18988&&adid=22222222227294048475&wl0=&wl1=g&wl2=c&wl3=463027449076&wl4=pla-769472217322&wl5=9007793&wl6=&wl7=&wl8=&wl9=pla&wl10=125210027&wl11=online&wl12=434653362&veh=aff&clickid=SaYyIlzLPxyKTnRzgdQYyw8qUks0jt1dQ2Ss0I0&irgwc=1&sourceid=imp_SaYyIlzLPxyKTnRzgdQYyw8qUks0jtldQ2Ss0I0&affiliates_ad_id=612734&campaign_id=9383&sharedid=3045>.

Hip Hook, Retrieved from Internet, Retrieved on Oct. 16, 2020 <URL: https://www.christinekoth.com/hip-hook>.

* cited by examiner

*Primary Examiner* — Timothy A Stanis
*Assistant Examiner* — Kira B Daher

(57) ABSTRACT

The present invention is a massaging apparatus suited for trigger point therapy. The massaging apparatus suited for trigger point therapy contains an anchoring sheet, a thumb sleeve, and a massaging device. The anchoring sheet contains a sheet aperture, a first end, and a second end. The first end and the second end are terminally opposite to each other along the anchoring sheet. The sheet aperture is positioned adjacent to the first end, opposite to the second end. The sheet aperture traverses through the anchoring sheet. The thumb sleeve is connected within the sheet aperture. The thumb sleeve is concentrically aligned and connected to the sheet. The massaging device is hingedly connected to the thumb sleeve, opposite to the anchoring sheet through a first hinge.

20 Claims, 3 Drawing Sheets

FLEXOR PRESS

FIELD OF THE INVENTION

The present invention generally relates to an apparatus for trigger point therapy devices. Particularly, an apparatus intended to aid in applying pressure to the psoas and iliacus muscles.

BACKGROUND OF THE INVENTION

As the discussion of the psoas and iliacus muscles increases, a variety of therapeutic tools are developed. Awareness of poor habits such as sitting for extended periods of time, bad posture or lack of movement has noticeably increased. Therefore, there is more attention being spent on the fitness and the health and wellness industries.

Most tools currently on the market for self-treatment of the psoas and the iliac muscles require the user to lay prone on top of the tool using their body weight for pressure. When a user lays prone on top of the tools currently available on the market, the psoas and iliacus muscles become elongated, making them more painful to treat than if those muscles bellies were shortened while applying pressure. Having shortened muscle bellies before applying pressure is more in alignment with neuromuscular treatment protocol.

Therefore, there is a current need to for an apparatus which provides complete control of the pressure applied during use. Thus, an apparatus which creates more control for the user is proposed. The following document aims to provide an accurate and detailed description of the present invention without limiting the scope of the invention, and the accompanying figures are only intended to help illustrate the present invention. Thus, the accompanying figures do not limit the scope of the invention in any way, shape or form.

SUMMARY OF THE INVENTION

The present invention is a massaging apparatus suited for trigger point therapy. The massaging apparatus suited for trigger point therapy comprises an anchoring sheet, a thumb sleeve, and a massaging device. The anchoring sheet comprises a sheet aperture, a first end, and a second end. The first end and the second end are terminally opposite to each other along the anchoring sheet. The sheet aperture is positioned adjacent to the first end, opposite to the second end. The sheet aperture traverses through the anchoring sheet. The thumb sleeve is connected within the sheet aperture. The thumb sleeve is concentrically aligned and connected to the sheet. The massaging device is hingedly connected to the thumb sleeve, opposite to the anchoring sheet through a first hinge.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to “the preferred embodiment”, “one embodiment”, “some embodiments”, or “alternative embodiments” should be considered to be illustrating aspects of the present invention that may potentially vary in some instances, and should not be considered to be limiting to the scope of the present invention as a whole.

Figure 1:
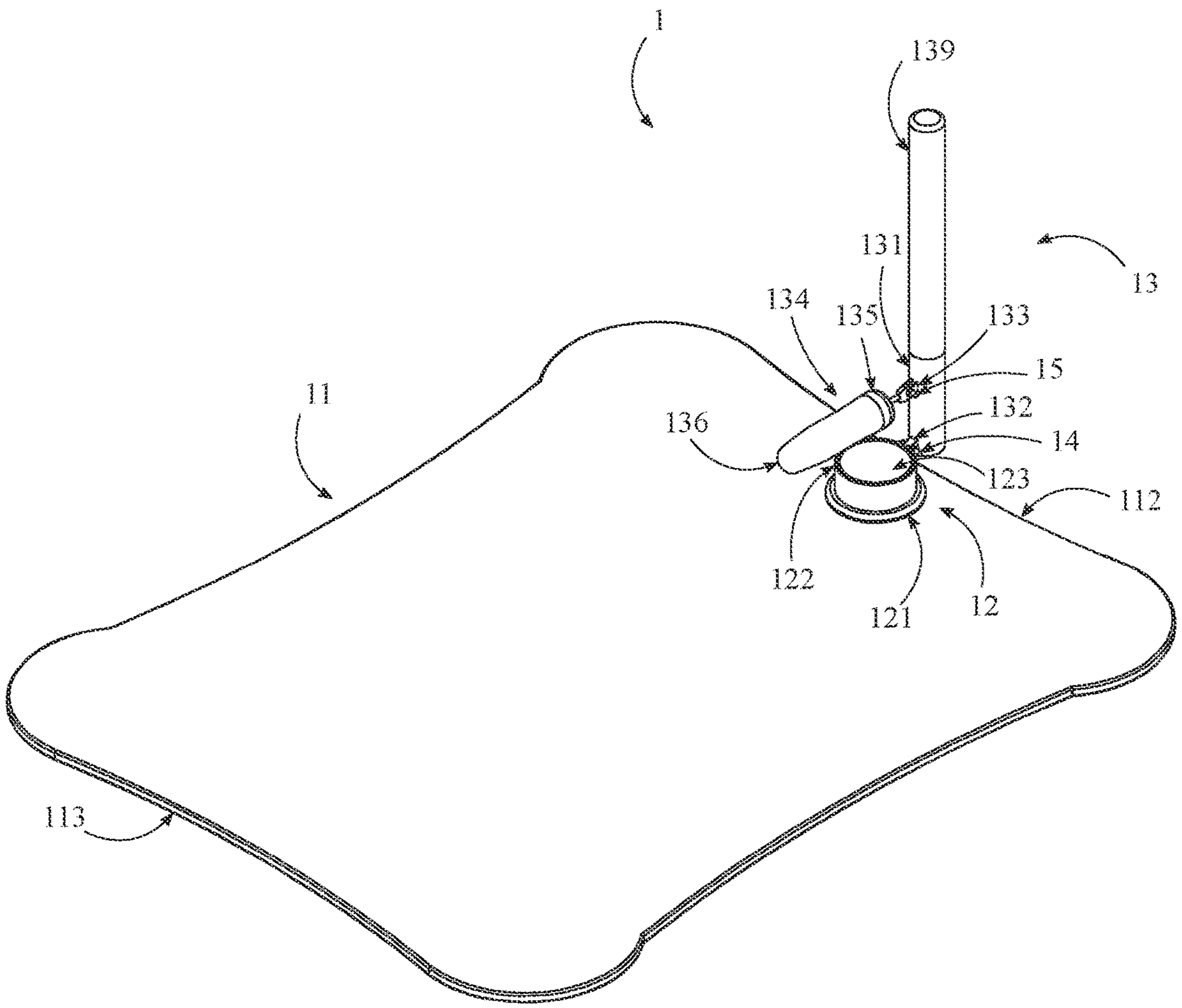
FIG. 1 is a perspective view of the assembly for the present invention.
Figure 2:
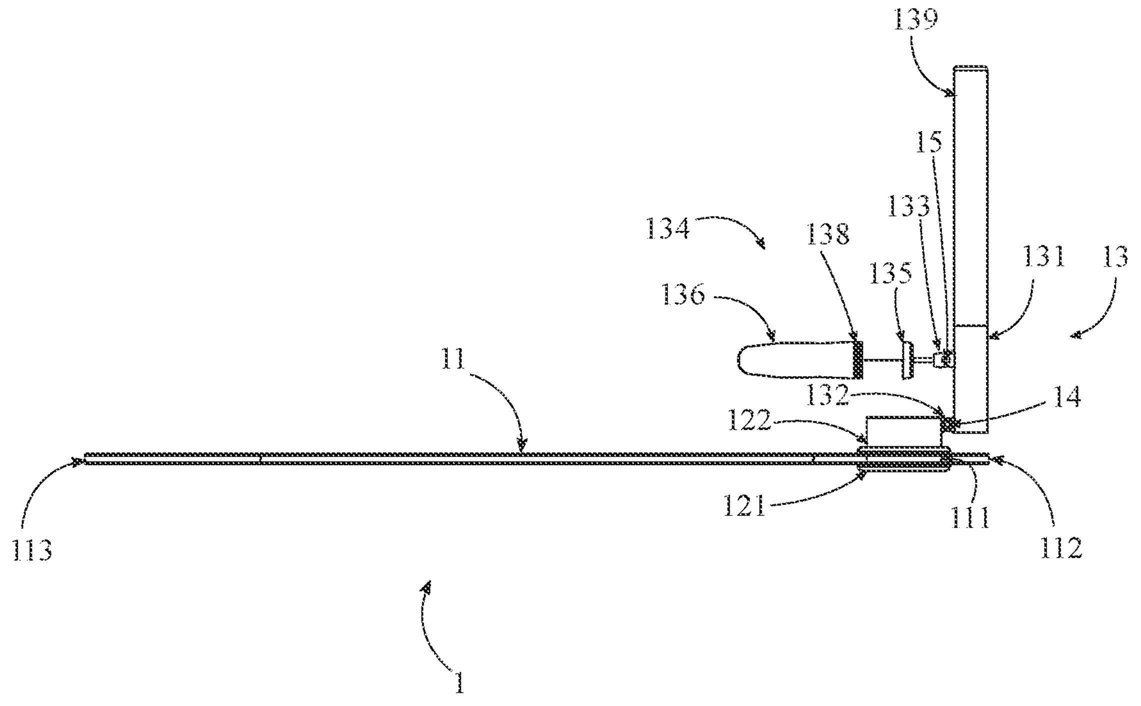
FIG. 2 is a side view of the assembly for the present invention.
Figure 3:
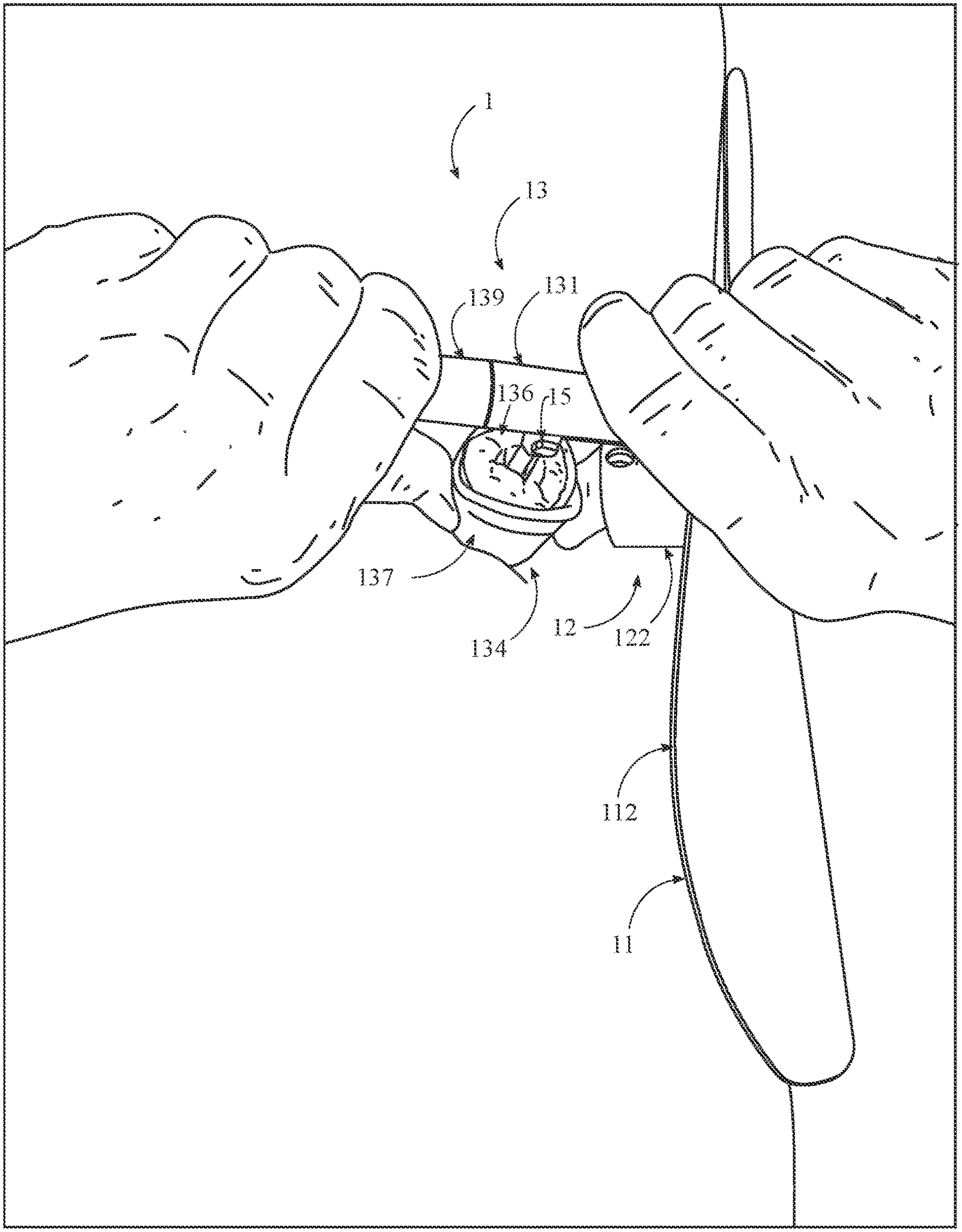
FIG. 3 is an illustration that shows the present invention being used to administer trigger point therapy.

In reference to FIGS. 1-3, the present invention is a massaging apparatus suited for trigger point therapy 1. The massaging apparatus suited for trigger point therapy 1 comprises an anchoring sheet 11, a thumb sleeve 12, and a massaging device 13. The anchoring sheet 11 comprises a sheet aperture 111, a first end 112, and a second end 113. The first end 112 and the second end 113 are terminally opposite to each other along the anchoring sheet 11. The sheet aperture 111 is positioned adjacent to the first end 112, opposite to the second end 113. The sheet aperture 111 traverses through the anchoring sheet 11. The thumb sleeve 12 is connected within the sheet aperture 111. The thumb sleeve 12 is concentrically aligned and connected to the sheet.

In reference to FIGS. 1-3, the massaging device 13 is hingedly connected to the thumb sleeve 12, opposite to the anchoring sheet 11 through a first hinge 132. In the preferred embodiment, the anchoring sheet 11 takes the form of any suitable implement to anchor the massaging apparatus suited for trigger point therapy 1 onto the user. More specifically, the anchoring sheet 11 takes the form of a flexible, yet durable sheet that wraps around the user’s bodily profile such that the anchoring sheet 11 is secured between the user’s bodily profile and the flat surface that the user is resting upon. In one instance, the user lays on top of the anchoring sheet 11, where the anchoring sheet 11 wraps along the user’s waistline, positioning the massaging device 13 along their back, shown in FIG. 3.

In the preferred embodiment, the anchoring sheet 11 is constructed out of an anti-slip material such as, but not limited to vinyl, silicone, rubber, leather, anti-slip fabrics, or any other suitable material. In the preferred embodiment, the first end 112 of the anchoring sheet 11 serves as the massaging device 13 end of the anchoring sheet 11, while the second end 113 serves as the anchoring end of the anchoring sheet 11. In the preferred embodiment, the sheet aperture 111 serves as a mounting hole to attach the thumb sleeve 12 along the first end 112 of the anchoring sheet 11. In the preferred embodiment, the thumb sleeve 12 serves as a handling element along the anchoring sheet 11 where the user can slip their thumb along the thumb sleeve 12 such that they can utilize the anchoring sheet 11 as a handling implement. Additionally, the thumb sleeve 12 provides access to the massaging device 13, allowing the user to grasp the massaging device 13 along the anchoring sheet 11.

In the preferred embodiment, the massaging device 13 takes the form of any suitable device suitable for administering trigger point therapy. In one embodiment, the massaging device 13 is a point therapy press device suitable for trigger point therapy. In various embodiments, the massaging device 13 may take the form of vibratory point massagers, oscillating point massagers, thermal point massagers, or any other suitable massaging device 13. In the preferred embodiment, the first hinge 132 allows the massaging device 13 and the thumb sleeve 12 to pivot along the anchoring sheet 11, allowing the user to position the massaging device 13 along the targeted bodily area of the patient at any specified angle.

In reference to FIGS. 1-3, the thumb sleeve 12 comprises a rim 121, a collar 122, and a bushing aperture 123. The rim 121 is concentrically aligned and connected to the sheet aperture 111. The collar 122 is concentrically aligned and connected to the rim 121. The bushing aperture 123 traverses from the rim 121 to the collar 122. The rim 121 serves as the primary connection element of the thumb sleeve 12 that secures the thumb sleeve 12 to the sheet aperture 111. In the preferred embodiment, the rim 121 may take the form of an eyelet rivet type connection element but may take the form of any other suitable connection element. In the preferred embodiment, the collar 122 serves as the extruded sleeve portion of the thumb sleeve 12 that is oriented towards the massaging device 13. The collar 122 serves as a thumb handling implement, securing the thumb along the sheet aperture 111. In the preferred embodiment, the bushing aperture 123 takes the form of the thumb hole that goes through the thumb sleeve 12.

In reference to FIGS. 1-3, the massaging device 13 comprises a handle body 131 and a massaging element 134. The handle body 131 is hingedly connected adjacent to the thumb sleeve 12, opposite to the anchoring sheet 11 through the first hinge 132. The massaging element 134 is connected adjacent to the handle body 131. In the preferred embodiment, the handle body 131 serves as the handing implement and chassis of the massaging device 13, allowing the user to grasp and control the massaging device 13 in conjunction with the thumb sleeve 12. In the preferred embodiment, the handle body 131 is made out any suitable and durable material such as but not limited to steel, aluminum, nylon, or any other suitable material. In the preferred embodiment, the massaging element 134 of the massaging device 13 takes the form of the main massaging implement that administers trigger point therapy along a targeted area. In one embodiment, the massaging element 134 takes the form of a foam trigger point massage tip. In various embodiments, the massaging element 134 may take the form of forked massage tips, ball-type tips, or any other suitable massaging element 134.

In reference to FIGS. 1-3, the massaging device 13 further comprises a leverage element 139. The leverage element 139 is connected adjacent to the massaging device 13, opposite to the thumb sleeve 12. In the preferred embodiment, the leverage element 139 takes the form of a leverage handle that allows the user to apply more force and pressure from the massaging device 13 to the targeted bodily area of a patient. In the preferred embodiment, the massaging element 134 is connected between the handle body 131 and the leverage element 139. More specifically, the leverage element 139 enables the user of the massaging apparatus suited for trigger point therapy 1 to exert more force and pressure from the massaging element 134 to the targeted bodily area of the patient.

In reference to FIGS. 1-3, the handle body 131 further comprises a second hinge 133. The handle body 131 is hingedly connected adjacent to the thumb sleeve 12, opposite to the anchoring sheet 11 through the first hinge 132. The massaging element 134 is hingedly connected adjacent to the handle body 131 through the second hinge 133. In the preferred embodiment, the second hinge 133 allows the user to position the massaging element 134 along the targeted bodily area of the patient at any specified angle.

In reference to FIGS. 1-3, the massaging element 134 comprises a tip connector 135 and a tip insert 136. The massaging element 134 is connected adjacent to the handle body 131. The tip insert 136 is removably attached to the tip connector 135 through a tip fastener 138. In the preferred embodiment, the tip fastener 138 takes the form of any suitable type of fastener such as but not limited to threads, barbs, or any other suitable type of fastener. In the preferred embodiment, the massaging element 134 further comprises a tip cover 137. The tip insert 136 is positioned within the tip cover 137. The tip cover 137 takes the form of a buffering layer that encapsulates the tip insert 136. In the preferred embodiment, the tip cover 137 takes the form of any suitable covering element, such as but not limited to latex layering, silicone layering, or any other suitable covering element.

In reference to FIGS. 1-3, the massaging apparatus suited for trigger point therapy 1 further comprises a first locking element 14 and a second locking element 15. The first locking element 14 is operatively engaged with the first hinge 132, where the first locking element 14 is configured to operatively fix the first hinge 132 to a locked configuration. The second locking element 15 is operatively engaged with the second hinge 133, where the second locking element 15 is configured to operatively fix the second hinge 133 to a locked configuration. In the preferred embodiment, the first locking element 14 and the second locking element 15 takes the form of any suitable type of locking implement that fixes the first hinge 132 or the second hinge 133 from pivoting. In various embodiments, the first locking element 14 and the second locking element 15 takes the form of push-button style locking hinge implements but may take the form of any other suitable locking implement.

Although the invention has been explained in relation to its preferred embodiment, it is to be understood that many other possible modifications and variations can be made without departing from the spirit and scope of the invention as hereinafter claimed.

What is claimed is:

1. A massaging apparatus suited for trigger point therapy comprising:

an anchoring sheet;

a thumb sleeve;

a massaging device;

the anchoring sheet comprising a sheet aperture, a first end, and a second end;

the first end and the second end being terminally opposite to each other along the anchoring sheet;

the sheet aperture being positioned adjacent to the first end, opposite to the second end;

the sheet aperture traversing through the anchoring sheet;

the thumb sleeve being connected within the sheet aperture;

the thumb sleeve being concentrically aligned and connected to the sheet aperture; and the massaging device being hingedly connected to the thumb sleeve through a first hinge.

2. The massaging apparatus suited for trigger point therapy as claimed in claim 1 comprising:

the thumb sleeve comprising a rim, a collar, and a bushing aperture;

the rim being concentrically aligned and connected to the sheet aperture;

the collar being concentrically aligned and connected to the rim; and the bushing aperture traversing from the rim to the collar.

3. The massaging apparatus suited for trigger point therapy as claimed in claim 1 comprising:

the massaging device comprising a handle body and a massaging element;

the handle body being hingedly connected adjacent to the thumb sleeve through the first hinge; and the massaging element being connected adjacent to the handle body.

4. The massaging apparatus suited for trigger point therapy as claimed in claim 1 comprising:

the massaging device further comprising a leverage element; and the leverage element being connected to the massaging apparatus, opposite to the thumb sleeve.

5. The massaging apparatus suited for trigger point therapy as claimed in claim 1 comprising:

the massaging device comprising a handle body, a leverage element, and a massaging element;

the handle body being hingedly connected adjacent to the thumb sleeve through the first hinge; and the massaging element being connected between the handle body and the leverage element.

6. The massaging apparatus suited for trigger point therapy as claimed in claim 1 comprising:

the massaging device comprising a handle body and a massaging element;

the handle body further comprising a second hinge;

the handle body being hingedly connected adjacent to the thumb sleeve through the first hinge; and the massaging element being hingedly connected adjacent to the handle body through the second hinge.

7. The massaging apparatus suited for trigger point therapy as claimed in claim 1 comprising:

the massaging device comprising a handle body, a massaging element, and a leverage element;

the handle body comprising a second hinge;

the handle body being hingedly connected adjacent to the thumb sleeve through the first hinge;

the massaging element being hingedly connected to the handle body through the second hinge; and the leverage arm being connected adjacent to the handle body, opposite to the thumb sleeve.

8. The massaging apparatus suited for trigger point therapy as claimed in claim 1 comprising:

the massaging device comprising a handle body and a massaging element;

the massaging element comprising a tip connector and a tip insert;

the handle body being hingedly connected adjacent to the thumb sleeve through the first hinge;

the massaging element being hingedly connected adjacent to the handle body through a second hinge; and the tip insert being removably attached to the tip connector through a tip fastener.

9. The massaging apparatus suited for trigger point therapy as claimed in claim 1 comprising:

the massaging device comprising a handle body, a massaging element, and a leverage element;

the massaging element comprising a tip connector and a tip insert;

the handle body being hingedly connected adjacent to the thumb sleeve through the first hinge;

the massaging element being hingedly connected adjacent to the handle body through a second hinge;

the leverage element being connected adjacent to the handle body, opposite to the thumb sleeve; and the tip insert being removably attached to the tip connector through a tip fastener.

10. The massaging apparatus suited for trigger point therapy as claimed in claim 1 comprising:

a first locking element;

a second locking element;

the massaging device comprising a handle body, a massaging element, and a leverage element;

the handle body comprising a second hinge;

the handle body being hingedly connected adjacent to the thumb sleeve through the first hinge;

the massaging element being hingedly connected to the handle body through the second hinge;

the leverage element being connected adjacent to the handle body, opposite to the thumb sleeve;

the first locking element being operatively engaged with the first hinge, wherein the first locking element is configured to operatively fix the first hinge to a locked configuration; and the second locking element being operatively engaged with the second hinge, wherein the second locking element is configured to operatively fix the second hinge to a locked configuration.

11. The massaging apparatus suited for trigger point therapy as claimed in claim 1 comprising:

a first locking element;

a second locking element;

the massaging device comprising a handle body, a massaging element, and a leverage element;

the handle body comprising a second hinge;

the massaging element comprising a tip connector and a tip insert;

the handle body being hingedly connected adjacent to the thumb sleeve through the first hinge;

the massaging element being hingedly connected to the handle body through the second hinge;

the tip insert being removably attached to the tip connector through a tip fastener;

the leverage element being connected adjacent to the handle body, opposite to the thumb sleeve;

the first locking element being operatively engaged with the first hinge, wherein the first locking element is configured to operatively fix the first hinge to a locked configuration; and the second locking element being operatively engaged with the second hinge, wherein the second locking element is configured to operatively fix the second hinge to a locked configuration.

12. The massaging apparatus suited for trigger point therapy as claimed in claim 1, wherein the massaging device is a point therapy press device.

13. The massaging apparatus suited for trigger point therapy as claimed in claim 1, wherein the anchoring sheet is constructed out of an anti-slip material.

14. The massaging apparatus suited for trigger point therapy as claimed in claim 1 comprising:

the massaging device comprising a handle body and a massaging element;

the massaging element comprising a tip connector and a tip insert;

the handle body being hingedly connected adjacent to the thumb sleeve through the first hinge;

the massaging element being connected adjacent to the handle body; and the tip insert being removably attached to the tip connector through a tip fastener.

15. The massaging apparatus suited for trigger point therapy as claimed in claim 14 comprising:

the massaging element further comprising a tip cover; and the tip insert being positioned within the tip cover.

16. The massaging apparatus suited for trigger point therapy as claimed in claim 1 comprising:

a first locking element; and the first locking element being operatively engaged with the first hinge, wherein the first locking element is configured to operatively fix the first hinge to a locked configuration.

17. The massaging apparatus suited for trigger point therapy as claimed in claim 16 comprising:

a second locking element;

the massaging device comprising a handle body and a massaging element;

the handle body comprising a second hinge;

the handle body being hingedly connected adjacent to the thumb sleeve, opposite to the anchoring sheet through the first hinge;

the massaging element being hingedly connected adjacent to the handle body through the second hinge; and the second locking element being operatively engaged with the second hinge, wherein the second locking element is configured to operatively fix the second hinge to a locked configuration.

18. The massaging apparatus suited for trigger point therapy as claimed in claim 16 comprising:

a second locking element;

the massaging device comprising a handle body, a massaging element, and a leverage element;

the handle body comprising a second hinge;

the handle body being hingedly connected adjacent to the thumb sleeve, opposite to the anchoring sheet through the first hinge;

the massaging element being hingedly connected to the handle body through the second hinge;

the leverage element being connected adjacent to the handle body, opposite to the thumb sleeve; and the second locking element being operatively engaged with the second hinge, wherein the second locking element is configured to operatively fix the second hinge to a locked configuration.

19. A massaging apparatus suited for trigger point therapy comprising:

an anchoring sheet;

a thumb sleeve;

a massaging device;

the anchoring sheet comprising a sheet aperture, a first end, and a second end;

the thumb sleeve comprising a rim, a collar, and a bushing aperture;

the first end and the second end being terminally opposite to each other along the anchoring sheet;

the sheet aperture being positioned adjacent to the first end, opposite to the second end;

the sheet aperture traversing through the anchoring sheet;

the thumb sleeve being concentrically aligned and connected to the sheet aperture;

the rim being concentrically aligned and connect to the sheet aperture;

the collar being concentrically aligned and connected to the rim;

the bushing aperture traversing from the rim to the collar; and the massaging device being hingedly connected to the thumb sleeve through a first hinge.

20. A massaging apparatus suited for trigger point therapy comprising:

an anchoring sheet;

a thumb sleeve;

a massaging device;

a first locking element;

a second locking element;

the anchoring sheet comprising a sheet aperture, a first end, and a second end;

the massaging device comprising a handle body, a massaging element, and a leverage element;

the handle body comprising a second hinge;

the massaging element comprising a tip connector and a tip insert;

the first end and the second end being terminally opposite to each other along the anchoring sheet;

the sheet aperture being positioned adjacent to the first end, opposite to the second end;

the sheet aperture traversing through the anchoring sheet;

the thumb sleeve being connected within the sheet aperture;

the thumb sleeve being concentrically aligned and connected to the sheet aperture;

the massaging device being hingedly connected to the thumb sleeve, opposite to the anchoring sheet through a first hinge;

the handle body being hingedly connected adjacent to the thumb sleeve through the first hinge;

the massaging element being hingedly connected to the handle body through the second hinge;

the tip insert being removably attached to the tip connector through a tip fastener;

the leverage element being connected adjacent to the handle body, opposite to the thumb sleeve;

the first locking element being operatively engaged with the first hinge, wherein the first locking element is configured to operatively fix the first hinge to a locked configuration; and the second locking element being operatively engaged with the second hinge, wherein the second locking element is configured to operatively fix the second hinge to a locked configuration.

* * * * *